Patented June 10, 1924.

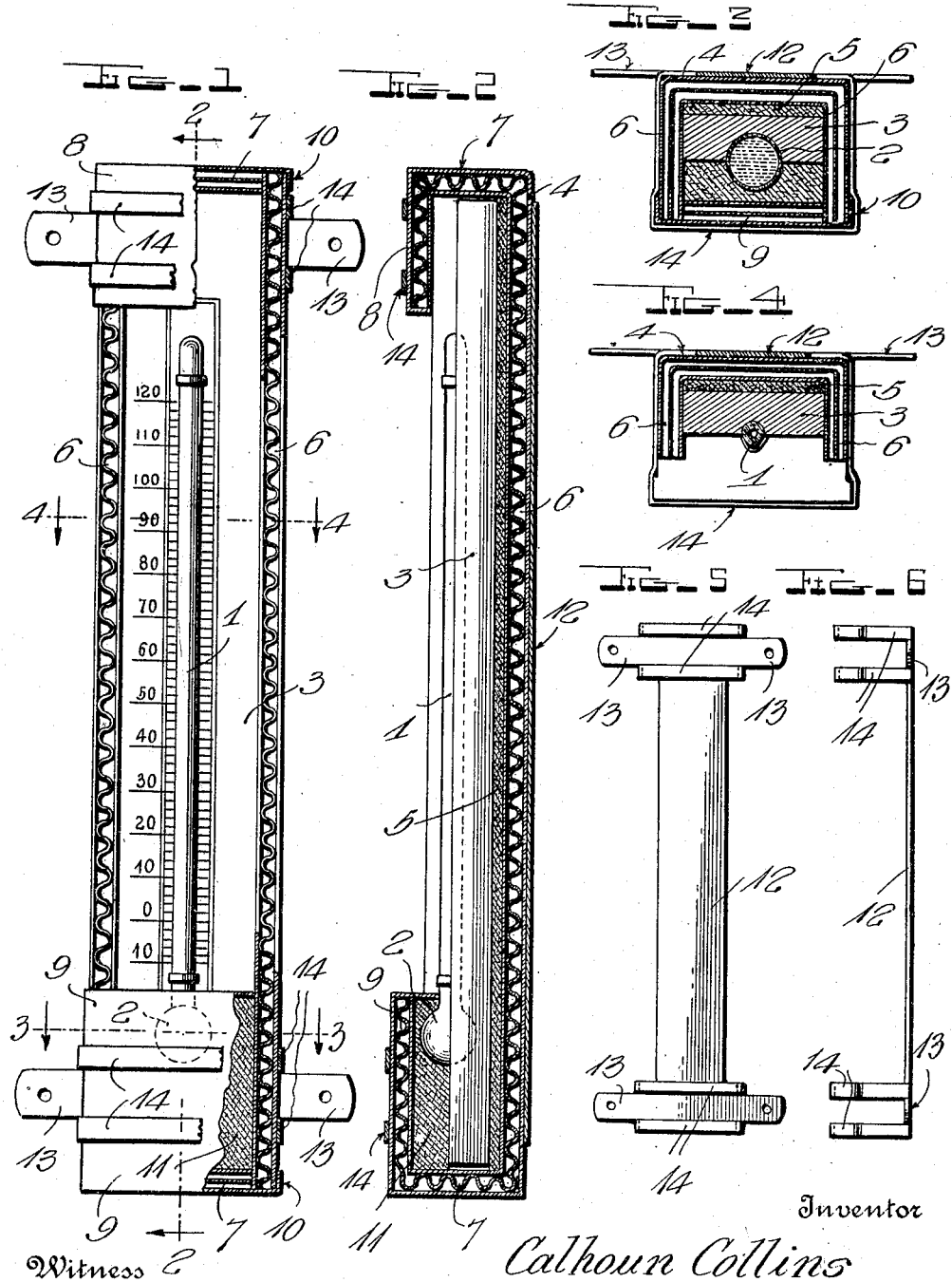

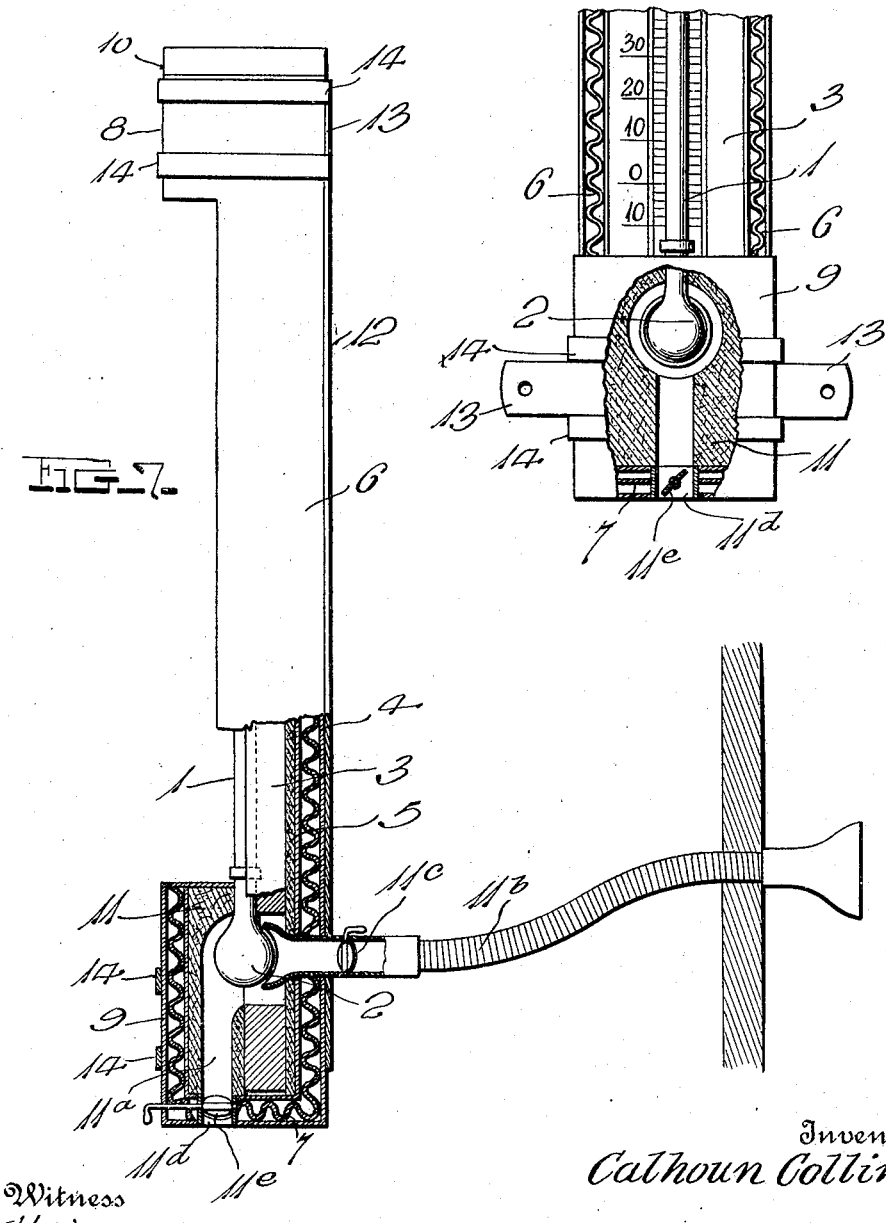

1,497,548

UNITED STATES PATENT OFFICE.

CALHOUN COLLINS, OF BAKERSFIELD, CALIFORNIA.

THERMOMETER INSULATOR AND HOLDER.

Application filed November 6, 1922. Serial No. 599,358.

*To all whom it may concern:*

Be it known that I, CALHOUN COLLINS, a citizen of the United States, residing at Bakersfield, in the county of Kern and State of California, have invented certain new and useful Improvements in a Thermometer Insulator and Holder; and I do declare the following to be a full, clear, and exact description of the invention, such as will enable others skilled in the art to which it appertains to make and use the same.

My invention relates to thermometers and more particularly to those designed principally for use within automobiles. It is well known that when a thermometer is mounted upon the instrument board or at some other point where it receive the heat from the motor, it does not accurately show the average temperature of the interior of the machine, but rises perceptibly when the motor heats in climbing hills, and whenever it is struck by air drafts from the outside, the temperature indicated drops. It is one object of my invention to protect the thermometer against momentary rises and falls in the temperature of the particular location in which it is installed, so that it will more accurately show the average temperature of the machine.

Another object of my invention is to provide a casing for a thermometer having a valved air passage adapted when desired to supply outside air to a space around the thermometer bulb. Thus by positioning the encased thermometer within an automobile, building or other housing and running the air passage from the exterior, either the outside or the inside temperature may be shown, simply by proper control of the valve.

A further object is to provide a novel form of holder which not only supports the thermometer but retains its insulating covering in place.

With the foregoing in view, the invention resides in the novel subject matter hereinafter described and claimed, the description being supplemented by the accompanying drawing.

Figure 1 is a front elevation partly broken away and in section, showing a thermometer equipped with one form of my invention.

Figure 2 is a vertical sectional view of the thermometer casing or insulator, showing the thermometer in edge elevation.

Figures 3 and 4 are horizontal sectional views as indicated by the lines 3—3 and 4—4 of Fig. 1.

Figures 5 and 6 are respectively a front elevation and an edge view of the holder.

Figure 7 is a side elevation partly broken away and in section, showing the form of the invention provided with a fresh air inlet.

Figure 8 is a front elevation partly broken away and in section.

In the drawings above briefly described, the numeral 1 designates an ordinary thermometer tube having the usual bulb 2 at its lower end, being mounted upon the well known elongated back 3. In the form of construction here shown, the insulating protector for the thermometer is formed of the well known "straw board" which consists of two layers of cardboard with a sheet of corrugated cardboard between them. Moreover, I have shown the insulating casing formed from a single sheet of this "strawboard", but it will be understood that this is not essential.

The numeral 4 designates the back wall of the protecting casing which extends over the rear side of the thermometer back 3, and if desired asbestos or the like 5 may be interposed between the two as shown in Figs. 2, 3, 4 and 7. From the vertical edges of the back 4, the material is bent forwardly to provide a pair of vertical side walls 6 which engage the vertical edges of the thermometer back 3. The upper and lower ends of the back 4 are bent forwardly to provide the end walls 7 of the casing to engage the ends of the thermometer back 3 and these ends are in turn bent vertically to provide upper and lower front sections 8 and 9 respectively. The end walls 7 and the front sections 8 and 9 are preferably received between the side walls 6 but the outer layer of strawboard on these parts 7, 8 and 9 preferably extends across the edges of the side walls 6 and is turned laterally to form flanges 10 which may be glued or otherwise secured against the outer faces of the side walls 6. Such details as these however may be departed from if desired.

By an inspection of Figs. 1, 2, and 7, it will be seen that the front section 8 is of insufficient height to extend over the upper portion of the tube 1, whereas the lower front section 9 extends in front of the bulb 2, a packing of asbestos or the like 11 being preferably interposed between said front section 9 and the adjacent portion of the thermometer.

In the form of construction shown in Figs. 7 and 8 the lower portion of the casing is formed with chamber 11ª, in which the bulb 2 is located, this chamber having an air inlet 11ᵇ leading from the outside air and provided with a valve 11ᶜ. Chamber 11ª is also provided with an air outlet 11ᵈ controlled by a valve 11ᵉ. The chamber 11ª may be formed in any desired manner but I have shown the packing 11 recessed for this purpose.

By employing the construction just described, it will be seen that the encased thermometer when mounted on the interior of an automobile or other housing, may be made to register the inside temperature, when the valves 11ᶜ and 11ᵉ are closed, but when these valves are opened, outside air will be circulated around the bulb to show the temperature outside of the automobile or other housing in which the thermometer is used. Thus the device is of particular advantage when traveling from high to low altitudes and vice versa.

In connection with the protecting casing above described, I prefer to employ the form of holder which has been illustrated. This holder includes a vertical back plate 12 extending substantially throughout the length of and in contact with the rear side wall 4 of the casing, each end of said plate 12 having oppositely extending attaching ears 13 and a pair of forwardly extending horizontal frames or yokes 14 disposed one above and one below said ears. These frames or yokes snugly receive the upper and lower ends of the casing and hold it in place upon the back plate 12 and the latter may be secured to any desired support.

By employing the construction shown or some other adequate construction, it will be seen that the thermometer will not be subject to fluctuating temperature changes and hence will more accurately show the average temperature of the machine in which it is used. Furthermore, the construction of Figs. 7 and 8 may be made to show either the outside or the inside temperature and it is to be understood that the use of my invention is not restricted to automobiles. The present disclosure is for illustrative purposes only, it being possible to embody the invention in a number of ways and in connection with different thermometers without departing from its spirit.

I claim:

1. A thermometer casing composed of insulation material, said casing comprising a back wall, side and end walls extending forwardly from said back wall, and upper and lower vertically disposed walls extending toward each other from said end wall, and an additional wall extending from the upper free edge of said lower front wall toward said back wall forming a compartment at the bottom of said casing in which the bulb of the thermometer is adapted to be disposed.

2. The combination with a thermometer tube mounted on the front side of a back member and provided at its lower end with the usual bulb; of an insulating casing for the thermometer back member, comprising a back wall, vertical side walls extending forwardly from the edges of said back wall and receiving the thermometer back member therebetween, end walls extending forwardly from the upper and lower ends of said back wall at the ends of the back member, and vertical front sections extending from said ends at the front side of said back member.

3. A structure as specified in claim 2, the lowermost of said front sections extending to a point in front of the bulb, and an insulating packing between this front section and the bulb.

4. A structure as specified in claim 2, said end and front sections being formed with flanges secured against the outer sides of said side walls.

5. The combination with a thermometer and a vertically elongated insulating casing therefor; of a back plate against which said casing rests, said back plate having attaching ears, and forwardly extending yokes snugly receiving the ends of said casing.

6. A thermometer casing holder of the class described comprising an elongated back plate having attaching ears and yokes extending forwardly from the ends of said plate to receive the ends of the casing.

7. A temperature indicator of the class described comprising a thermometer, an insulation casing for the bulb thereof, said casing having a valved conduit leading thereto to permit the passage of external air therethrough, and a valved conduit connected with said casing and communicating with said passage for transmitting external air to the casing, whereby to permit said thermometer to be used for alternately indicating the temperature of internal or external air.

In testimony whereof I have hereunto affixed my signature.

CALHOUN COLLINS.